United States Patent [19]

Cornacchia

[11] Patent Number: 4,798,278

[45] Date of Patent: Jan. 17, 1989

[54] CONVEYOR FOR TURNING PACKAGES UPSIDE DOWN

[75] Inventor: Vincent Cornacchia, Paramus, N.J.

[73] Assignee: General Machine Design, Inc., Saddle Brook, N.J.

[21] Appl. No.: 76,703

[22] Filed: Jul. 23, 1987

[51] Int. Cl.⁴ .............................................. B65G 47/24
[52] U.S. Cl. .................................. 198/399; 198/404; 414/765; 414/767; 414/773
[58] Field of Search ............... 198/404, 412, 394, 382, 198/403, 463.4, 463.6; 414/758, 764, 765, 767, 773

[56] References Cited

U.S. PATENT DOCUMENTS

| | | | |
|---|---|---|---|
| 2,293,192 | 8/1942 | Campbell | 198/404 X |
| 3,184,079 | 5/1965 | Buccicore | 414/767 X |
| 3,581,866 | 6/1971 | Hottendorf | 414/762 X |
| 3,596,747 | 8/1971 | Irving, Jr. et al. | 198/404 |
| 4,354,788 | 10/1982 | Giusti | 198/404 X |
| 4,606,387 | 8/1986 | Weislogel et al. | 198/403 X |
| 4,699,564 | 10/1987 | Cetrangolo | 198/404 X |

FOREIGN PATENT DOCUMENTS 128852  11/1978  Japan .................................. 198/412

Primary Examiner—Robert J. Spar
Assistant Examiner—Cheryl L. Gastineau
Attorney, Agent, or Firm—Fred A. Keire; Curtis, Morris & Safford

[57] ABSTRACT

A conveyor for turning packages upside down in a very gentle manner in a device which is interposed in line with the feed conveyor and discharge conveyor and conveys the package to the discharge conveyor after the package has been turned over. The conveyor includes a rotatable turning element which receives at least one package, and an intermittent rotational mechanism which tumbles the turning element in rotation. This structure eliminates the need for any mechanism which grips the package in order to turn it.

11 Claims, 4 Drawing Sheets

CONVEYOR FOR TURNING PACKAGES UPSIDE DOWN

This invention relates to conveyors for turning packages upside down. More particularly, this invention relates to an in line conveyor which as part of the conveying function also has the capability to turn a package upside down in a gentle fashion such that upon completion of the turning, the package may be readily placed on a discharge conveyor and moved on to a next work station and the like.

This invention further relates to a method for turning over packages such that these may be readily handled on a conveyor for necessary orientation, i.e., selective orientation. A package thus oriented may then be sent to a work station or for necessary labeling and/or placing information on the package after it has been properly oriented.

BACKGROUND FOR THE INVENTION

In the art of package handling, a conveyor has been traditionally employed to forward a package from one work station to another to accomplish the necessary filling, closing, labeling or securement of the package, such as by strapping, stapling, wrapping and the like.

It has often been found necessary to have the package secured or labeled both at the top and at the bottom and in the process the package has had to be inverted such that the top finds itself on the bottom and the bottom is at the top.

Moreover, if intermittent sorting is necessary, the conveyor device must function as a regular conveyor such that the package can be forwarded on to the discharge side of the conveyor without inverting the same. Still further, for packaging operations where the package must necessarily be secured at the top and bottom or some information or labeling placed both at the top and the bottom, it is necessary that these packages be selectively inverted as part of the work flow. Any handling of the package by a machinery that grips and/or turns the device requires additional space, generally perpendicular to the direction of the flow of the conveyor or overhead thereof and complicates the handling and/or space requirements.

BRIEF DESCRIPTION OF THE INVENTION

It has been a desideratum in the package handling arts to have a conveyor which will turn upside down a package without any damage to it and as part of an "in-line conveyor". The present invention answers the above with a simple and elegant solution in an efficient manner with outstanding results.

Still further, the present invention provides a sorting function in an "in-line" work flow where packages are randomly turned upside down for either opening, closing, stacking or shipping, or some other reason such that the work flow on a conveyor is not interrupted or additional machinery or side conveyors need not be used to accomplish the functions which the present apparatus may accomplish.

Inasmuch as conveying of packages is very efficient if labor intensive functions such as manual handling of the packages is not needed, it has been further found that such handling may be mechanized and/or properly controlled by sensing and/or reading devices, e.g., bar code reading devices. In this connection the present apparatus includes means for detecting information on the side of a package which would tell if the package is upside down and allows the activation of the present device in a manner such as to permit automatic functioning of this device, i.e., operator unaided package orientation. However, an operator may likewise be positioned near the machine and appropriately activate the package turning function whenever it is necessary.

The above has been accomplished with the present apparatus, which is compact, handles the packages in a very gentle and efficient manner in an "in-line" conveyor where the package turning device is passively operated by the conveyor belt itself, i.e., it is not independently driven. The present apparatus is considerably simpler as the machinery necessary to operate the device is single motor driven. The in-line conveyor apparatus saves expensive floor space.

Typical use of the disclosed conveyor is in a packaging line where the package needs to be filled and closed and information needs to be placed on the package and either read from the top or bottom or where the packaging information must be on the top of the package. Such packages must be oriented such that these are showing only the top or the bottom for scanning by appropriate scanning devices for subsequent sorting and/or distribution or unloading, for example such as in the Post Office or any distributing warehouse associated with air freight or air express freights and the like, or where an automatic unloading is necessary.

DETAILED DESCRIPTION OF THE INVENTION AND EMBODIMENTS THEREOF

With reference to the present invention and the disclosure herein, the present embodiments of the turning conveyor for turning packages upside down are illustrated with reference to the Figures, wherein.

Figure 1:
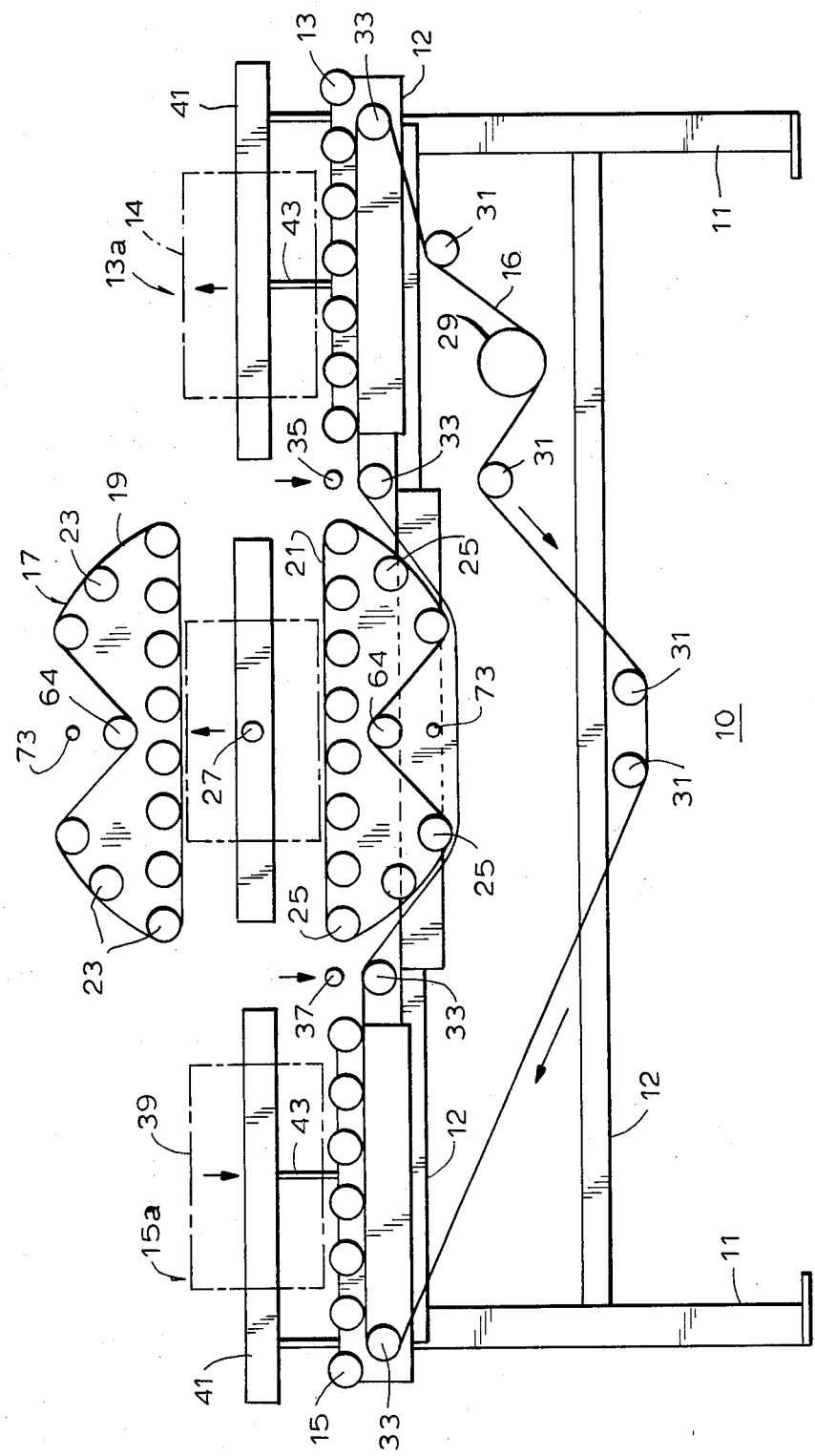
FIG. 1 shows schematically in a side elevation view the conveyor for turning a package, including the conveyor drive belt and the turning conveyor device which accomplishes the turning.

Turning now to FIG. 1, it illustrates the conveyor apparatus 10, a stand 11 therefor, and a conveyor frame 12.

The conveyor rollers 13 for the feed conveyor 13a are shown in the drawing.

Likewise the discharge conveyor rollers 15 are shown for discharge conveyor 15a. Each conveyor roller rotates on a shaft shown as 18.

As it will be further discussed herein, one of the advantages of the present conveyor is that the discharge conveyor 15a may become a feed conveyor and the feed conveyor 13a may become a discharge conveyor.

A belt 16 which drives the conveyor has been shown, including the arrow direction therefor. Instead of a belt, a chain and a sprocket on each roller shaft 18 may be used. Likewise the arrow direction of the conveyor rollers 13 and 15 have been indicated.

A package to be turned over has been shown as 14, including an arrow on the package to indicate the positioning capability of the device. The drive train for the belt 16 has been indicated schematically, but will be further explained herein.

The turning device 17 consists of an upper belt 19 trained around upper conveyor rollers 23. The lower belt 21 is trained around the lower conveyor rollers 25. One turning shaft 27 for the turning device 17 has been shown in FIG. 1 in the center thereof.

The lower conveyor rollers 25 which are being driven via the belts 16 and 21 also include a rotation direction for the rollers. In the turning device 17, the package is urged to the discharge end by a belt.

The entire turning device 17 and its counterclockwise rotation direction has also been shown in FIG. 1.

The conveyor belt 16 is being driven by conveyor belt motor 29. Conveyor belt 16 is also trained around an appropriate number of idler rollers 31 of which 3 have been shown in FIG. 1, as well as guide rollers 33 for the conveyor belt 16 at each end of the feed 13a and discharge 15a conveyors, respectively. A belt 16 may drive only the turning device and the discharge or feed conveyor, but in that event the discharge or feed conveyor, as the case may be, must be independently driven. However, an advantage of the present invention is the single drive means, i.e., belt 16.

As conveyor belt 16 travels in the direction indicated by the arrows at the underneath side of the conveyor rollers 13 or 15, the rollers rotate in a uniform manner in a counterclockwise direction. As mentioned before, chain and sprocket driven rollers may be used, but then the guide rollers 33 on both sides of the turning device must also carry a belt under the turning device 17 for driving the turning device 17.

As it can well be appreciated, upon reversal of the motor travel which is easily accomplished with a DC motor, the discharge conveyor 15a becomes a feed conveyor and a previous feed conveyor becomes a discharge conveyor.

Figure 2:
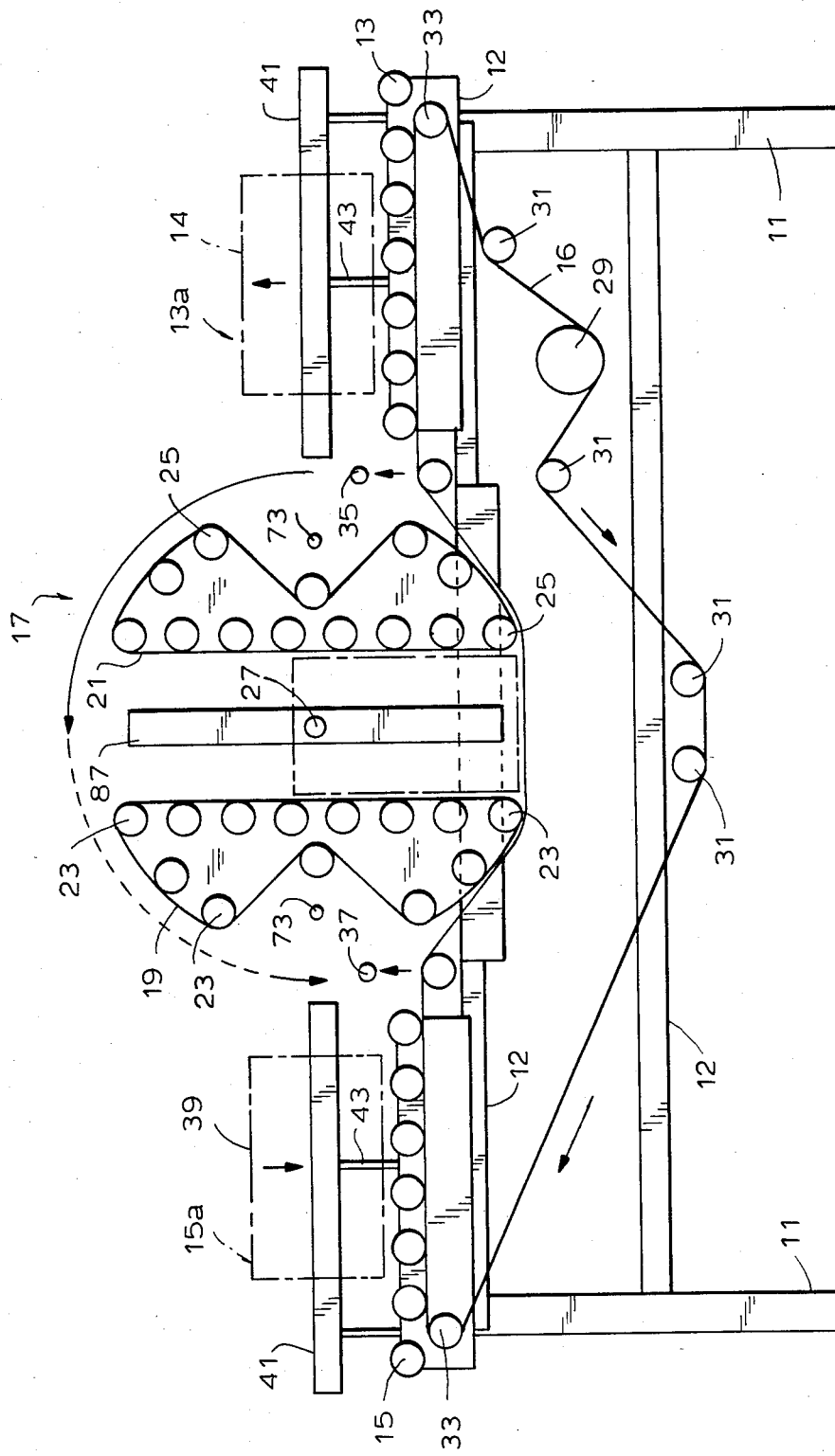
FIG. 2 shows a side elevation view of the device in FIG. 1, but with a package in a 90° turn position.

As the belt 16 rotates and leaves the guide roller 33, it engages the lower belt 21 for the turning device 17 and causes the entire device, with the belt, to travel in a counterclockwise direction. By selecting the appropriate number of conveyor rollers such as 23 or 25 and 64 for tensioning, the conveyor belts 19 and 21 and the relative rate of rotation of the turning conveyor device 17, the entire device 17 is made to rotate in a counterclockwise direction as shown in FIGS. 1 and 2.

Still further, the feed conveyor 13a has a gate roller 35 which prevents the next package from entering the turning device 17 when the gate 35 is activated. This conveyor roller 35 travels in a vertical direction as shown in FIG. 1, and will be further discussed in connection with the discussion of the apparatus shown in FIG. 3.

Similarly, the discharge conveyor 15a has a counterpart gate roller 37 which prevents a package, such a package 14, from being ejected before the turning device 17 has rotated sufficiently so that the package 14 engages the belt 16 as the turning device 17 is being rotated about its shafts 27.

Upon a full 180° turn of the turning device 17, the package 14 has been completely turned around and discharged on the discharge conveyor 15a and is now shown with the arrow on the package pointing downwardly.

Appropriate guide rails 41 for the feed conveyor 13a and the discharge conveyor 15a are provided. Support brackets 43 for the guide rails 41 have also been provided, as shown.

In FIG. 2, all of the items illustrated in FIG. 1 have also been shown, including the package which is now stacked on its end and will be rotated appropriately for the discharge as inverted package 14 on the discharge conveyor 15a. It is also noted that a 180° turn allows the instant reloading of the turning device 17 as soon as the discharge conveyor 15a gate roller 37 is lowered in a position providing a continuous path for the inverted package 14.

As it is well illustrated by the schematic drawing showing the actual turning of the packages, it is clear that upon reversal of the belt 16, the turning conveyor device 17 may be rotated in a clockwise direction.

Figure 3:
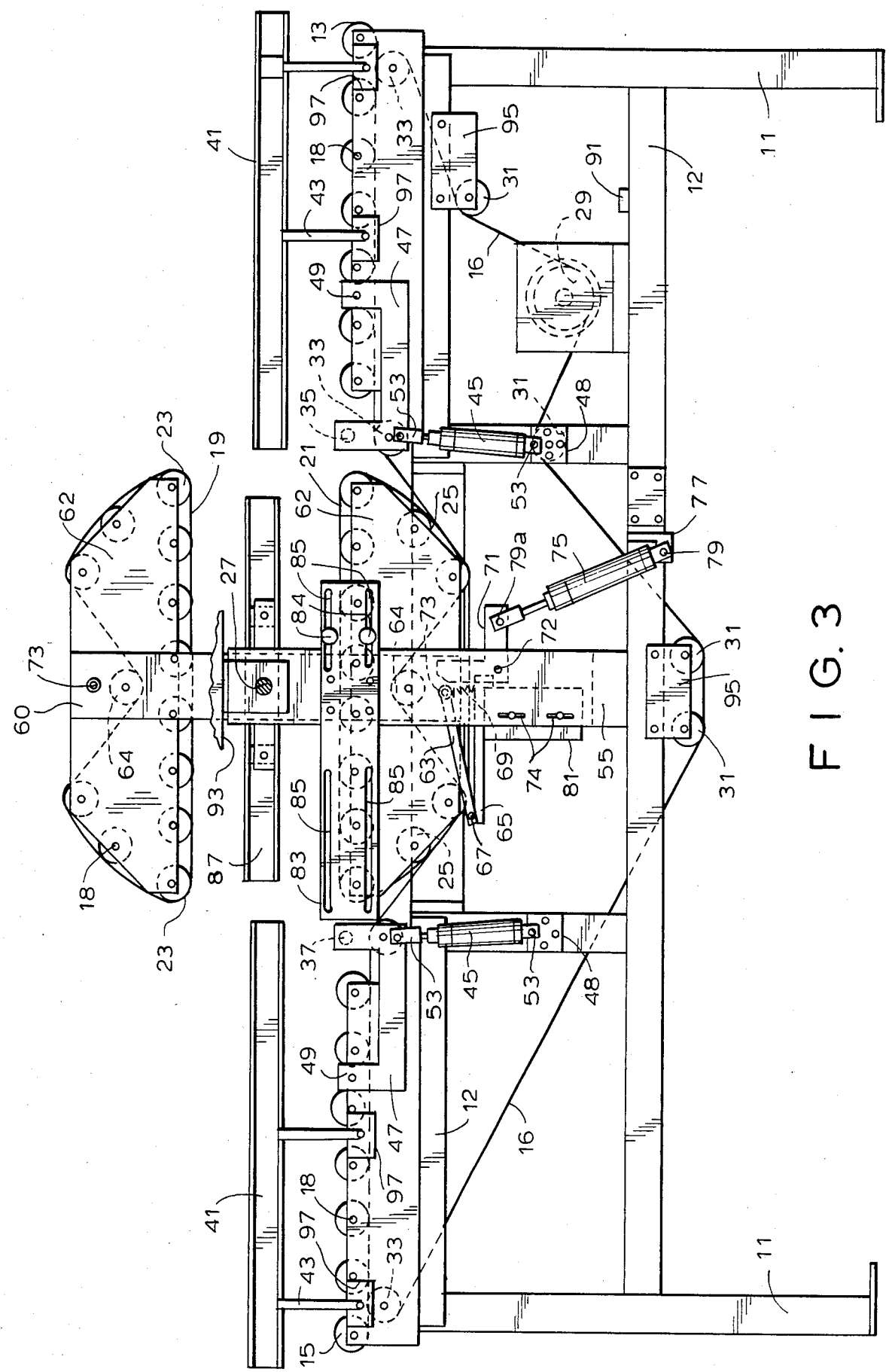
FIG. 3 illustrates in greater detail in a side elevation view the present conveyor device without the drive belt shown in FIG. 1.

Turning now to FIG. 3, it illustrates in greater detail the various elements used for the accomplishment of the above turning. Further, additional features used with the present machine have also been shown. Thus gate roller 35 is activated by pneumatic cylinder 45 for the feed conveyor 13a. Similarly, the discharge conveyor 15a gate roller 37 is activated by a like cylinder 45 at the entrance to the gate cylinder. Conveyor rollers 35 and 37, which are not driven by the conveyor belt 16, are mounted on a pair of bracket angles 7 for each side of the respective conveyors, that is, 13a or 15a on each side of the conveyor.

The attachment bracket 48 for pneumatic cylinders 45 is shown as being affixed to the conveyor frame 12, and each of the pneumatic cylinders 45 have a pivot pin 53. When the pneumatic cylinder 45 is appropriately extended, the bracket 47 pivot on pin 49 bars with gate roller 35 the entrance into the turning device 17. Likewise gate roller 37 prevents the entrance onto the discharge conveyor 15a of a package.

The guide rollers 33 at the exit end of the feed conveyor 13a or at the entrance end of the discharge roller 15a are part of the conveyor assembly and do not move when the double acting pneumatic cylinder 45 is extended or retracted as pneumatic cylinder 45 activates the gate rollers 35 or 37, respectively.

Because pneumatic cylinder 45 is attached to the bracket 47, it must likewise be appropriately pinned and articulated for movement, and a toggle 53 is provided for it. In this manner, appropriate compensation for pneumatic cylinder 45 and for the arcuate motion of bracket 47 has been provided.

Figure 4:
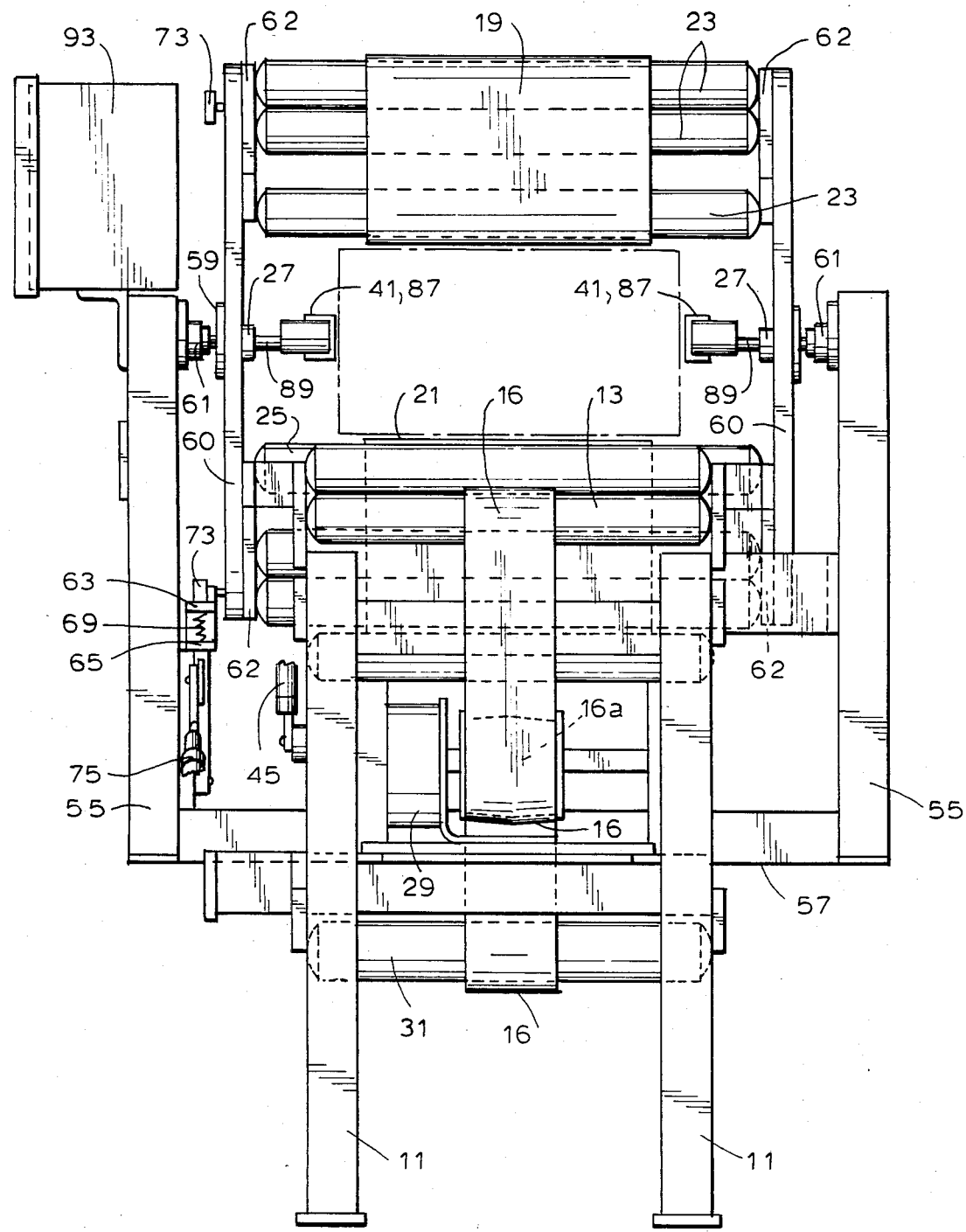
FIG. 4 illustrates a partial cross sectional view of the device shown in FIG. 3.

With respect to upright posts 55, a pair of these are used and have been shown best in FIG. 4. These upright posts 55 support the turning device 17, allow for its rotation on shafts 27 and are affixed to main cross beam 57.

The shafts 27 for the turning device 17 extend from the pair of upright posts 55 through flange bearings 59, again one on each side for turning device 17. Flange bearings 59 are mounted in the main support plates labeled as 60, again as best seen in FIG. 4 of the drawings. Main support plates 60 have affixed thereto conveyor frame plates 62, four of which are used, as shown in FIG. 4. The same designation has been used for the conveyor frame plates 62 for the upper and lower conveyor rollers 23 and 25, respectively.

Shafts 27 are supported on upright posts 55 by a shaft support device 61, best seen in FIG. 4. A pair of adjustable rollers 64 have been provided for tensioning the upper belt 19 and the lower belt 21 on the conveyor turning device 17. The adjustment for the belt tensioning rollers 64 has not been shown, but can be easily accomplished in the conventional manner such as by a conveyor shaft pinned in a slot by a bolt secured with a locknut.

A lever bracket 65 for mounting thereon the tension lever 63 has been provided on upright posts 55 and is best shown in the front plan view in FIG. 3. The tension lever 63 is biased upwardly by spring 69 and pivots on pivot pin 67. Spring 69 is compressed by tension lever 63 as cam roller 73 advances as illustrated in FIG. 3. This compression of the spring 69 allows the turning device 17 to be appropriately slowed down as it is rotated on shafts 27. When cam roller 73 hits latch 71, the pneumatic cylinder 75 (affixed to frame 12 on bracket 77 with its pivot points 79 and at 79a on the latch 71) acts as a shock absorber and arrests the rotation of the conveyor turning device 17. Although the rotation is arrested for the entire turning device 17, the belt 21 is still being carried along with the moving belt 16 as shown in FIG. 1. When discharge gate roller 37 is removed as an obstruction to the entry on the discharge conveyor 15a, the package 14 now turned upside down is advanced onto discharge conveyor 15a. Thus, belt 21, still moving, urges the package forwardly and onto the discharge conveyor 15.

As soon as the package has been discharged from the turning device 17, discharge conveyor 15a gate roller 37 is pushed upwardly by pneumatic cylinder 45 in a "gate closed" position. The feed conveyor gate roller 35, still in the "gate closed" position, is now retracted by pneumatic cylinder 45 and is in a "gate open" position, allowing one or more packages 14 to enter onto the lower belt 21 of the turning conveyor device 17. As soon as the package 14 has entered into the turning device 17, pneumatic cylinder 45 and gate roller 35 are activated for a "gate closed" position. The feed conveyor 13a gate roller 35 prevents any additional packages from entering into turning device 17. At that time the pneumatic cylinder 75 retracts in a power stroke latch 71 acting as a stop device for cam roller 73 by pivoting the latch 71 around the pivot point 72. A new cycle is started with turning device 17 being rotated counterclockwise and turning around a new package which is in turning device 17.

In the event that the feed direction of the feed conveyor 13a and the discharge conveyor 15a are sought to be reversed, an entire assembly of the tension lever 63, tension lever bracket 65, spring 69, latch 71, and a pair of tension lever cam rollers 73 are mounted on the opposite side of turning device 17, such as on right hand upright posts 55 (cf. FIG. 4). In the event a reverse feed is desired, the tension lever 63 is inactivated on one side by appropriately retracting latch 71 by cylinder 75 and allowing the lefthand side of the turning device 17 to rotate freely around unimpeded, except for the compression of spring 69. However, the clockwise rotating turning device 17 is then stopped by the opposite counterpart tension lever 63 and cam roller 73 in cooperation with latch 71 and cylinder 75.

Thus appropriate directional reversal may be accomplished by merely operating the belt 16 in any desired direction by means such as a DC motor.

A plate 81 which provides for an appropriate vertical adjustment for tension lever 63 and tension lever bracket 65 likewise allows the control of the rate at which the turning device 17 is slowed down during rotation when the tension lever cam roller 73 engages the tension lever 63 and spring 69. This adjustment feature may be readily changed, such as by an Servomotor activated screw and threaded sleeve or any other device to accommodate changes in the package weight when these are being turned over in the turning device 17. This adjustment possibility has been indicated by the adjustment slots 74 in FIG. 3.

A suitable number of photoelectric eyes 84 or other scanning devices may be mounted on the photoelectric eye bracket 83 having adjustment slots 85 therefor.

Instead of the photoelectric eye 84, an appropriate scanning device such as a bar scanner found in grocery stores may be mounted which may determine either the up or down position of the package by the orientation of the bar code on the package and thus allow the appropriate random turning of the device or an appropriate operation of turning device 17 without its turning function being activated.

In this manner a proper, one-directional orientation of all randomly oriented packages or, if desired, alternative orientation of packages may be accomplished and an appropriate stacking, e.g., palletizing, of packages achieved as desired.

Appropriate side rails 87 shown in FIG. 4, are also provided for the turning device 17, one o each side as an extension to shafts 27. The extension has been shown as an adjustment bracket 89 for side rails 87. The side rails 87 may be made of an appropriate material, such as highly polished steel or an appropriately highly lubricant plastic material, e.g., Teflon and the like.

It is also to be understood that if the reverse operation of the turning device 17 is sought, the appropriate sequence of operating the pneumatic activation of cylinders 45 and 75 may easily be accomplished by an appropriate reverse electronic circuit with controlled solenoid valves, etc., well known to those of ordinary skill in the pneumatically controlled machine art.

Likewise any other device which accomplished the electronic manipulation of the turning sequences or scanning and/or the intermittent or random operation of a turning device 17 are well known in the art and are means which are readily available.

In FIG. 4, the pulley 16a is shown as a driven pulley for belt 16 and this pulley may be of various widths and appropriate placement as suited for the appropriate turning of turning device 17. The width of the belt desired is also a function of the upper limit of package weight, i.e., for heavier packages wider belts are suggested.

Motor 29 as previously mentioned may be an AC motor for one-directional driving or it may be a DC motor for the bi-directional operation of belt 16. Still further, an appropriate forward-and-reverse clutch devices which drives the pulley 16a in both directions, although not shown, may also be readily provided.

A belt tensioning device 91 for tensioning the belt 16 has been shown schematically in FIG. 3.

An electrical circuit cabinet in which the electronic circuits are housed is shown in FIG. 4 as 93 (so as not to clutter the illustrations of the device shown in FIG. 3).

A further bracket for idler pulley 31 has also been shown as 95, both for the lower idler pulleys 31 for belt 16, as well as the right hand idler pulleys 31.

Still further, bracket 97 for support braces 43 for conveyor side rails 41 has also been shown in FIG. 3.

As illustrated by the above discussion, an extremely versatile turning device has been provided for conveyors, readily inverting every package or randomly inverting packages which need to be turned or any combination of inversion which is sought to be accomplished when the conveyor is operated as a single unit or in series, either operator-assisted or with appropriately designed electronic sensing and control circuit elements.

As shown above, the novel turning conveyor has a versatility heretofore unknown for in-line turning conveyors. This versatility is further accomplished with very gentle handling of the package as during the turning operation, if necessary, the speed of the belt 16 may also be slowed down. Moreover, the distance between upper belt 19 and lower belt 21 of the turning device 17 may be adjusted to suit the package height with less space between these belts providing less prominent motion of package 14 during the turning operation. When so adjusting the space, only the four conveyor plates 62 need to be moved.

In addition to the above functions of turning the package over end for end upside down, as it is known in the conveyor arts, when arresting one end of a package such as by a bar or a brake post, the package may be turned on a conveyor 90° in a horizontal direction. When such package is then moved along the conveyors with one side forward (as opposed to one ed forward), and a 45° incline is placed at the end of a conveyor, the package may be flipped on one side (if necessary, assisted by a rotating roller which aids in the flipping). When so flipped, a package may then be further turned around sideways in a turning device 17 such as when necessary for sorting or label reading and the like. However, the preferred operation of the turning device 17 is for end for end turning.

Still further, depending on the package size, it is also possible to operate the turning device 17 by admitting two packages 14 in the device and then turning these over. As it is evident from the above, the great versatility of the above-described machine in package sorting, orientation and positioning makes the novel machine especially welcome for in-line sorting operations or any in-line preparation of a package for the next work station.

What is claimed is:

1. An in-line conveyor type machine for turning at least one package upside down, said machine comprising:
   a feed conveyor means, including a drive means for said feed conveyor means;
   a first gate means interconnected with said feed conveyor means;
   means for activating said first gate means for closing and opening said first gate means;
   a rotatable turning means including conveying means thereof operatively interconnected with said first gate means, wherein said first gate means admits at least one package into said turning means upon opening of said first gate means, said conveying means presenting a first moving surface and a drive means therefor;
   a discharge conveyor means including a drive means for said discharge conveyor means;
   a second gate means interconnected with said discharge conveyor and interconnected further with said turning means and with said first gate means; and
   means for intermittent rotational operation of said turning means interconnected with said first and second gate means, said means for intermittent rotational operation including a drive means presenting a second moving surface, said second moving surface engaging said first moving surface for tumbling said turning means in said intermittent rotational operation;
   said drive means for said feed and discharge conveyor means further being interconnected with said drive means for said first moving surface of said conveying means of said turning means.

2. The machine as defined in claim 1, wherein the means for intermittent rotational operation are random and interconnected with a means for signalling an orientation of a package in said turning means.

3. The machine as defined in claim 1, wherein the means for intermittent rotational operation is sequential and interconnected with said first and second gate means.

4. The machine as defined in claim 1, wherein said conveying means of said turning means include means for rotating a package and conveying said package within said turning means, including rotationally conveying said turning means.

5. The machine as defined in claim 1, wherein said turning means include means for intermittent arrest of said turning means operatively interconnected with means for driving at least one feed or discharge conveyor means.

6. The machine as defined in claim 1, wherein said conveying means of said turning means include an upper and a lower conveying means therefor.

7. The machine as defined in claim 1, wherein said conveying means of said turning means include an upper and lower conveying means, a belt for each of said upper and lower conveying means; means for intermittent arrest of said turning means, and means for continuous operation of said belt for said lower conveying means for said turning means.

8. The machine as defined in claim 1, wherein said turning means include means for intermittent rotation of said turning means in clockwise or counterclockwise direction.

9. The machine as defined in claim 1, wherein said turning means include means for turning at least two packages.

10. The machine as defined in claim 9, wherein said turning means include means for detecting the presence of two packages, said means for detecting the presence of two packages being operatively interconnected with said first gate means and said feed conveyor.

11. The machine as defined in claim 1, wherein said turning means include spaces apart upper and lower conveying means, said upper and lower conveying means being rotationally interchanged with each other upon each turn of at least one package.

* * * * *